United States Patent
Yu et al.

(10) Patent No.: US 7,611,776 B2
(45) Date of Patent: Nov. 3, 2009

(54) PROPYLENE POLYMER COMPOSITION AND ORIENTED FILM PREPARED THEREBY

(75) Inventors: Luqiang Yu, Beijing (CN); Meifang Guo, Beijing (CN); Shijun Zhang, Beijing (CN); Jinliang Qiao, Beijing (CN); Wenbo Song, Beijing (CN); Qingshan Ma, Beijing (CN); Wei Zhang, Beijing (CN); Liangshi Wang, Beijing (CN); Xi Wang, Beijing (CN); Hao Tang, Beijing (CN); Rongmei Liu, Beijing (CN)

(73) Assignees: China Petrochemical & Chemical Corporation, Beijing (CN); Beijing Research Institute of Chemical Industry, China Petroleum & Chemical Corporation, Beijing (CN)

( * ) Notice: Subject to any disclaimer, the term of this patent is extended or adjusted under 35 U.S.C. 154(b) by 253 days.

(21) Appl. No.: 11/338,619

(22) Filed: Jan. 24, 2006

(65) Prior Publication Data

US 2006/0182987 A1   Aug. 17, 2006

(30) Foreign Application Priority Data

Jan. 28, 2005   (CN) .................. 2005 1 0004901

(51) Int. Cl.
*B32B 27/00* (2006.01)
*B32B 27/08* (2006.01)
*C08L 23/00* (2006.01)

(52) U.S. Cl. ................. 428/515; 428/500; 428/516; 525/240

(58) Field of Classification Search ............. None
See application file for complete search history.

(56) References Cited

U.S. PATENT DOCUMENTS

| | | | |
|---|---|---|---|
| 5,286,552 A * | 2/1994 | Lesca et al. | 428/220 |
| 5,453,318 A | 9/1995 | Giacobbe | |
| 5,874,505 A | 2/1999 | Saito et al. | |
| 6,495,634 B2 * | 12/2002 | Huffer et al. | 525/240 |
| 2001/0012874 A1 | 8/2001 | Huffer et al. | |
| 2003/0165703 A1 | 9/2003 | Pelliconi et al. | |

FOREIGN PATENT DOCUMENTS

| | | |
|---|---|---|
| CN | 1102419 | 5/1995 |
| CN | 1330086 | 9/2002 |
| CN | 1404500 | 3/2003 |
| EP | 0 339 804 A2 | 3/1989 |
| EP | 0 339 804 A3 | 3/1989 |
| JP | 7-126460 | 5/1995 |
| JP | 11-60639 | 3/1999 |
| WO | 03/031174 | 4/2003 |
| WO | 03/031174 A2 | 4/2003 |
| WO | 03/031174 A3 | 4/2003 |

OTHER PUBLICATIONS

Computer-Generated English Translation of Claims and Specification and English Abstract of JP 11-60639 dated Mar. 2, 1999.
Computer-Generated English Translation of Claims and Specification and English Abstract of JP 7-126460 dated May 16, 1995.
English Translation of CN 1102419 dated May 10, 1995.

* cited by examiner

*Primary Examiner*—Sheeba Ahmed
(74) *Attorney, Agent, or Firm*—Ladas and Parry LLP

(57) ABSTRACT

The present invention provides a propylene polymer composition for producing a biaxially oriented film, comprising propylene random copolymer and propylene homopolymer; wherein the propylene random copolymer is a copolymer of propylene and ethylene, optionally comprising one or more alpha-olefins of $C_4$-$C_{10}$; the propylene polymer composition has an overall isotacticity index, as determined by nuclear magnetic resonance method, of greater than or equal to 96.5%, and an ethylene content of greater than 0.3 wt %; and wherein, the melt flow rate of the propylene random copolymer is lower than that of the propylene homopolymer. The biaxially oriented polypropylene film produced by the propylene polymer composition of the present invention exhibits excellent physical properties, and has, in the absence of any stiffening agent, relatively higher modulus and stiffness. Moreover, the process for producing the biaxially oriented polypropylene film is featured with a good film-forming stability and a high film-forming stretching speed.

21 Claims, No Drawings

PROPYLENE POLYMER COMPOSITION AND ORIENTED FILM PREPARED THEREBY

CROSS-REFERENCE OF THE RELATED APPLICATIONS

This application is based upon and claims priority of Chinese Patent Application No. 200510004901.9 filed on Jan. 28, 2005, the contents being incorporated herein for reference in their entirety for all purposes.

TECHNICAL FIELD

The present invention relates to a propylene polymer composition, in particular, to a propylene polymer composition for producing a biaxially oriented film and a method for preparing the same, and to a biaxially oriented polypropylene film (BOPP) prepared by the composition.

BACKGROUND ART

Owing to its excellent optical properties, mechanical properties and packaging adaptability, polypropylene film has been widely applied to the field of packaging material. In particular, biaxially oriented polypropylene film (BOPP) has been widely applied to package various products such as foods, medicines, commodities and cigarettes and also applied as a substrate material for high-strength composite film, due to its features of softness, good transparency, non-toxicity, good water repellent property and high mechanical strength.

Biaxially oriented polypropylene film (BOPP) is generally produced with polypropylene resin as raw material by the steps of: extruding the resin to obtain a film, and then subjecting the film to biaxial stretching, heat treatment and cooling treatment. To meet the requirement of high-speed film production in a large scale, the polypropylene resin raw material should have both good tensile strength and excellent high-temperature stretching property. As far as polypropylene is concerned, it is generally deemed that a lower isotacticity index and a lower melting temperature of the polymer are favorable to the processing and forming of the BOPP film, but the mechanical properties such as tensile strength and stiffness of the film as obtained will be reduced. Thus, a method of adding $C_5$-$C_9$ petroleum resin to isotactic polypropylene material was developed in order to increase modulus of the material, thereby improving the stiffness of the finally obtained polypropylene film. For instance, Chinese Patent CN1102419A disclosed a propylene polymer composition comprising $C_5$ hydrocarbons free of polar group, the use of which can improve the steam barrier property, transparency and Young's modulus of the polypropylene oriented film obtained thereby. However, this method not only needs extra components thereby increasing the production cost, but also does not have a satisfactory result.

In the prior art, the methods for preparing BOPP films with propylene random copolymers, in particular, compositions comprising propylene random copolymers, as raw materials are also disclosed, wherein the random copolymers are generally copolymers of propylene and alpha-olefins such as ethylene. For instance, as disclosed in Chinese Patent CN1404500A, the amount of ethylene in propylene copolymer or in propylene polymer composition should be greater than 0.8 wt %, generally in the range of 0.8-1.5 wt %. Moreover, the MFR value of the first polypropylene (generally a homopolymer) is lower than that of the second propylene random copolymer, i.e., the molecular weight of the first polypropylene (generally a homopolymer) is higher than that of the second propylene random copolymer, and the difference in the MFR values being preferably greater than 5 g/10 min. Such control in ethylene content and melt flow rate in the propylene polymer composition might be applicable to the special polymerization reactor and special polymerization method, wherein two interconnected gaseous polymerization reaction zones are used, as adopted in the embodiment of that patent application. However, as to a common reactor or polymerization method, such control cannot balance the requirement of producing BOPP film and the achievement of polypropylene resin having satisfactory inherent properties, which mainly concern high soluble content of the polypropylene resin and reduced transparency and stiffness of the film.

In view of the situations in the prior art, it is desired to develop a propylene polymer composition for producing a biaxially oriented film, which can better balance the high-temperature stretching properties and physical properties of the film, thereby obtaining a BOPP film having excellent comprehensive properties.

The present inventors discovered by laborious experiments that by increasing the isotacticity of the polymer having a relatively higher MFR value (i.e., a relatively lower molecular weight) in the propylene polymer composition to keep the overall isotacticity of the propylene polymer composition at a relatively higher level, a polypropylene oriented film having high modulus, with its other properties such as transparency and mechanical properties being somewhat improved, can be obtained, without the addition of any stiffening agent (such as $C_5$-$C_9$ petroleum resin)

CONTENTS OF THE INVENTION

The present invention provides a propylene polymer composition for producing a biaxially oriented film, comprising propylene random copolymer and propylene homopolymer; wherein the propylene random copolymer is a copolymer of propylene and ethylene, optionally comprising one or more alpha-olefins of $C_4$-$C_{10}$. The propylene polymer composition has an overall isotacticity index, as determined by nuclear magnetic resonance (NMR) method, of greater than or equal to 96.5%, and an ethylene content of greater than 0.3 wt %.

To obtain a BOPP film having high stiffness (including high transverse Young modulus and longitudinal Young modulus), it is very important to provide a propylene homopolymer having a relatively higher isotacticity index. In principle, the higher, the better. In comparison with the prior art, the present invention differs in that: under the condition of maintaining a suitable range of ethylene content in the composition, the overall isotacticity index of the composition is controlled at a relatively higher level (being completely higher than that in the prior art) by increasing the isotacticity index of propylene homopolymer, thereby achieving the object of increasing the stiffness of the film.

In the present invention, the overall isotacticity index of the final propylene polymer composition is determined by NMR method, wherein the ethylene segments are regarded as defects. The formula for calculation is as follows:

$$T_{overall} = \frac{[mm] + \frac{1}{2}[mr \ \& \ PPE]}{[mm] + [mr \ \& \ PPE] + [rr \ \& \ EPE]}$$

wherein, $T_{overall}$ represents the overall isotacticity index of the propylene polymer composition, [mm], [mr], [rr], [PPE]

and [EPE] are molar contents of the corresponding triads (characterized by the corresponding peak areas after normalization).

A BOPP film having excellent properties can be obtained when the overall isotacticity index is greater than or equal to 96.5%, preferably greater than or equal to 97%, more preferably greater than or equal to 97.5%. In contrast, the propylene copolymer resin useful for producing BOPP film, as disclosed in the prior art, generally has an overall isotacticity index of less than 96%.

The crystallization distribution curve of the propylene polymer composition described herein is determined by CRYSTAF method (described in detail hereinafter) to obtain a Dispersion index R, wherein $R=(T_w/T_n-1)\times 100$, wherein $T_w$ and $T_n$ respectively represent weight-average and number-average crystallization temperatures calculated by CRYSTAF method. In the present invention, R is preferably less than or equal to 2.5, more preferably less than or equal to 2.0. In contrast, the R values of products known in the field are generally greater than 2.5.

Other properties of the present propylene polymer composition for producing the BOPP film are preferably as follows.

In the propylene polymer composition, the content of fraction soluble in xylene at room temperature (about 25° C.) is preferably less than 3 wt %, more preferably lower than 2.6 wt %, in particular preferably lower than or equal to 2.0 wt %. In general, the higher the content of fraction soluble in xylene is, the lower rigidity the film will have, and which higher content possibly causes that the film cannot contact directly with food, medicine and the like as a packaging material, or the article to be packaged may be polluted.

In order to obtain a BOPP film having excellent comprehensive properties and good processability, it is also very important to control the molecular weight and molecular weight distribution of the propylene polymer composition. Herein, it is preferred that, in the propylene polymer composition, the MFR value of the propylene random copolymer is controlled to be lower than that of the propylene homopolymer, i.e., the molecular weight of the propylene random copolymer is greater than that of the propylene homopolymer. The MFR value is determined under a load of 2.16 kg at 230° C. according to the method of ISO1133. Preferably, the propylene random copolymer has a MFR value of 0.05-0.5 g/10 min, and the finally obtained propylene polymer composition has a MFR value of 1-8 g/10 min. More preferably, the propylene random copolymer has a MFR value of 0.1-0.3 g/10 min, and the finally obtained propylene polymer composition has a MFR value of 2-4 g/10 min. The propylene polymer composition has a molecular weight distribution index (weight-average molecular weight/numeric-average molecular weight) of 4-10, preferably 5-7.

For satisfying the above requirements about molecular weight and molecular weight distribution, the mass ratio of propylene random copolymer and propylene homopolymer in the propylene polymer composition is generally 30:70 to 70:30, preferably 65:35 to 35:65, more preferably 55:45 to 45:55.

In one specific embodiment herein, it is usual to control the comomoner ethylene content of the propylene random copolymer in the propylene polymer composition, thereby making the ethylene content in the finally obtained propylene polymer composition to be greater than 0.3 wt %, preferably 0.3-0.8 wt %. Moreover, the propylene random copolymer further optionally comprises one or more alpha-olefins of $C_4$-$C_{10}$, said alpha-olefins of $C_4$-$C_{10}$ specifically including 1-butene, 1-pentene, 1-hexene, 4-methyl-1-pentene and 1-octene, preferably 1-butene.

In one preferred embodiment described herein, the propylene polymer composition is characterized by having:

(1) an overall isotacticity index, as determined by NMR method, of greater than or equal to 97%;

(2) an ethylene content of 0.3-0.8 wt %;

(3) a Dispersion index R of less than or equal to 2.0 according to the crystallization distribution curve as determined by a CRYSTAF, model 200;

(4) a content of fraction soluble in xylene at room temperature (about 25° C.) less than 2.6 wt %; and (5) a MFR value of 1-3 g/10 min, wherein the propylene random copolymer having a MFR value of 0.1-0.3 g/10 min.

The propylene polymer composition for producing biaxially oriented film in the present invention may be prepared by one or more polymerization steps. Preferably, it is prepared, in the presence of a Ziegler-Natta catalyst having high activity and high stereo-selectivity, by a method comprising two-step polymerization reactions, wherein one of the steps comprises copolymerizing propylene with ethylene and optionally one or more alpha-olefins of $C_4$-$C_{10}$ to obtain a propylene random copolymer, and the other step comprises homopolymerizing propylene to obtain a propylene homopolymer. The two-step polymerization reactions may be stepwise carried out in different or same reaction zone(s). However, the two-step polymerization reactions are in an arbitrary order.

The polymerization reactions as above described may be carried out in propylene liquid phase, or gas phase, or by using a liquid-gas combined process. In liquid phase polymerization, the polymerization temperature is 0-150° C., preferably 40-100° C.; and the polymerization pressure is higher than the saturated vapor pressure of propylene under the polymerization temperature. In gas phase polymerization, the polymerization temperature is 0-150° C., preferably 40-100° C.; and the polymerization pressure is normal pressure or higher, preferably 1.0-3.0 MPa (gauge pressure, the same below). The polymerization may be carried out continuously or intermittently. The continuous polymerization may be carried out by using two or more loop reactors_in series, or two or more kettle-type reactors in series, or two or more gas phase reactors in series; or the combinations of loop reactor, kettle-type reactor and gas phase reactor. As to continuous liquid phase polymerization, the catalyst generally needs to undergo continuous or intermittent prepolymerization. By prepolymerizing with propylene, the catalyst can effectively control the particle shape of polymer during reaction, and reduce the rupture of polymer particles; and also the polymerization activity of the catalyst can be brought into full effect. The prepolymerization reaction is generally carried out under relatively milder conditions, preferably the polymerization temperature is lower than 30° C., and the prepolymerization multiple is controlled within 3-1,000 times. In continuous gas phase polymerization, the catalyst may be either prepolymerized or not.

Whether in the homopolymerization or copolymerization of propylene, a molecular weight regulator is used for regulating the molecular weight of polymer, so that the MFR of propylene random copolymer is lower than that of propylene homopolymer. The molecular weight regulator is preferably hydrogen.

The polymerization reactions as above described are preferably carried out in the presence of a Ziegler-Natta catalyst having high stereo-selectivity. The "Ziegler-Natta catalyst having high stereo-selectivity" used herein refers to the catalyst capable of preparing a propylene homopolymer having isotacticity index of greater than 97%, preferably greater than 98%, more preferably greater than 99%. This type of catalyst generally comprises active solid catalyst component, preferably a Ti-containing solid catalyst as an active component and an organic aluminum compound as a co-catalyst component, to which an external electron donor component may be optionally added.

The concrete examples for this type of catalyst are disclosed in Chinese Patents: CN85100997A, CN1258680A, CN1258683A, CN1258684A, CN1091748A, CN1330086A, CN1298887A, CN1298888A and CN1436796A. These catalysts may be directly used or prepolymerized prior to use. The catalysts as disclosed in Chinese Patents: CN1330086A, CN85100997 and CN1258683A are particularly favorable for use in the present invention.

The Ti-containing active solid catalyst component may be prepared according to various methods.

Usually, the catalyst active component is prepared by loading a Ti compound and an internal electron donor compound on a $MgCl_2 \cdot nROH$ adduct, wherein the $MgCl_2 \cdot nROH$ adduct is an adduct of $MgCl_2$ and alcohol, preferably in the form of spherical particles; and wherein n is usually 2.0 to 3.5, R is an alkyl group having 1 to 4 carbon atoms, and the alcohol includes ethanol, propanol, isopropanol, butanol, isobutanol, isooctanol and etc. For the concrete preparation steps, one may refer to Chinese Patents CN1036011C and CN1330086A.

Additionally, the Ti-containing solid catalyst component may also be prepared by referring to the following method as disclosed in Chinese Patents CN85100997 and CN1258683A:

Firstly, magnesium halide is dissolved with a solvent system consisting of an organic epoxide, an organic phosphorus compound and an inert diluent to obtain a homogenous solution; the solution is mixed with a Ti compound, and then a solid is precipitated in the presence of an auxiliary precipitation; the solid is treated with an internal electron donor compound thereby loading it on the solid, if necessary, the solid is further treated with titanium tetrahalide and an inert diluent, thereby obtaining the Ti-containing solid catalyst component; wherein the auxiliary precipitation is one selected from organic anhydride, organic acid, ether and ketone. Wherein, the amounts of various components are, based on per mole of magnesium halide, as follows: the organic epoxide 0.2-10 mol, the organic phosphorus compound 0.1-3 mol, the auxiliary precipitation 0.03-1.0 mol, the titanium compound 0.5-150 mol, and the internal electron donor compound 0.01-5 mol, preferably 0.05-1 mol.

The internal electron donor compound in the catalyst component is usually selected from aliphatic dicarboxylic acid esters or aromatic dicarboxylic acid esters, preferably, dialkyl phthalates, for example, e.g., diethyl phthalate, diisobutyl phthalate, di-n-butyl phthalate, diisooctyl phthalate, di-n-octyl phthalate, and etc.

The internal electron donor compound can also be selected from a dihydric alcohol ester compound shown as in formula (I):

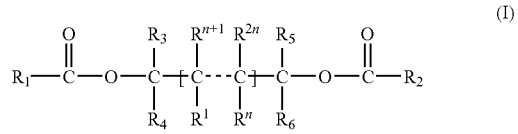

(I)

wherein, $R_1$-$R_6$ and $R^1$-$R^{2n}$ radicals, which are same or different, represent hydrogen, halogen, or substituted or unsubstituted linear or branched $C_1$-$C_{20}$ alkyl group, $C_3$-$C_{20}$ cycloalkyl group, $C_6$-$C_{20}$ aryl group, $C_7$-$C_{20}$ alkaryl, $C_7$-$C_{20}$ aralkyl, $C_2$-$C_{10}$ alkenyl, $C_{10}$-$C_{20}$ fused ring aryl or $C_2$-$C_{10}$ ester group; but with the proviso that $R_1$ and $R_2$ are not hydrogen; $R_3$-$R_6$ and $R^1$-$R^{2n}$ radicals optionally contain one or more heteroatoms to substitute carbon or hydrogen atom(s) or both of them; said heteroatom is selected from the group consisting of nitrogen, oxygen, sulfur, silicon, phosphorus or halo atom; optionally, one or more $R_3$-$R_6$ and $R^1$-$R^{2n}$ radicals are linked together to form a ring; n is an integer of 0 to 10.

This type of dihydric alcohol ester compound is disclosed in Chinese Patents CN1436766A, CN1436796A and CN1453298A.

The organic aluminum compound as a co-catalyst component preferably includes alkyl aluminum compound, more preferably trialkylaluminum such as triethylaluminum, triisobutylaluminum and tri-b-butyl aluminum. In the catalyst, the molar ratio of Ti/Al is 1:25-100.

In order to increase the overall isotacticity index of the final polymer composition, in particular the isotacticity index of propylene homopolymer in the composition, it is usually desired to introduce an external electron donor compound to the catalyst. The external electron donor compound is preferably an organic silicon compound having a formula $R_nSi(OR')_{4-n}$, wherein $0<n\leq3$; R and R', which are same or different, represent alkyl group, cycloalkyl group, aryl group, haloalkyl group and etc.; R may also be halo or hydrogen atom. Specifically, the external electron donor compound includes trimethylmethoxysilane, trimethylethoxysilane, trimethylphenoxysilane, dimethyldimethoxysilane, dimethyldiethoxysilane, methyl tert-butyldimethoxysilane, methylisopropyldimethoxysilane, diphenoxydimethoxysilane, diphenyldiethyoxysilane, phenyltrimethoxysilane, phenyltriethoxysilane, vinyltrimethoxysilane, cyclohexylmethyldimethoxysilane, dicyclopentyldimethoxysilane, diisopropyldimethoxysilane, diisobutyldimethoxysilane, 2-ethylpiperidyl-2-tert-butyldimethoxysilane, (1,1,1-trifluoro-2-propyl)-2-ethylpiperidyldimethoxysilane and (1,1,1-trifluoro-2-propyl)-methyldimethoxysilane and etc., During the polymerization reactions, the isotacticity index of polypropylene can be effectively controlled through regulating the ratio between the organic aluminum compound as a co-catalyst component and the organic silicon compound as an external electron donor component in the catalyst described herein. In order to obtain a propylene polymer composition having the desired properties, the ratio of said two components, based on the molar ratio of Al/Si, is preferably 4-30, more preferably 6-20.

In one preferred embodiment, the method for preparing the propylene polymer composition described herein comprises subjecting propylene to continuous or intermittent random copolymerization and homopolymerization reactions in two or more reaction zones in series; wherein, a molecular weight regulator such as hydrogen is added in different amounts to different reaction zones, so that the MFR of propylene copolymer is lower than that of propylene homopolymer; and wherein, the yield ratio of the copolymerization and homopolymerization of propylene is 30:70 to 70:30, the polymerization temperature is controlled in the range of 60-80° C., and the polymerization reactions are carried out in liquid phase.

Wherein, a specific embodiment includes subjecting propylene to continuous random copolymerization and homopolymerization reactions in two loop reactors in series. Wherein, in the presence of a Ziegler-Natta catalyst having high stereo-selectivity, the random copolymerization reaction of propylene and ethylene is carried out in the first loop reactor for a certain time, thereafter the reactants are transferred to the second loop reactor for carrying out the homopolymerization reaction of propylene; and wherein, hydrogen is added in different amounts to the first and second loop reactors, the hydrogen amount in the first loop reactor being lower than that in the second loop reactor, so that the MFR value of the propylene copolymer in the first stage is lower than that of the propylene homopolymer in the second stage. The yield ratio in the first and second loop reactors is about 65:35 to 55:45, the polymerization temperature in the two loop reactors is controlled in the range of 60-80° C., and the polymerization reactions are liquid phase bulk reactions.

Another specific embodiment comprises subjecting propylene to continuous random copolymerization and homopolymerization reactions in two kettle-type reactors in series. Wherein, in the presence of the above Ziegler-Natta catalyst of high efficiency as result of the prepolymerization, the random copolymerization reaction of propylene and ethylene is carried out in the first kettle-type reactor for a certain time, thereafter the reactants are transferred to the second kettle-type reactor for carrying out the homopolymerization reaction of propylene; and wherein, hydrogen is added in different amounts to the first and second kettle-type reactors, with the hydrogen amount in the first kettle-type reactor being lower than that in the second kettle-type reactor. Alternatively, the homopolymerization reaction of propylene may be firstly carried out prior to the copolymerization reaction of propylene and ethylene. No matter which of the steps is firstly carried out, the MFR value of the propylene copolymer is lower than that of the propylene homopolymer. The yield ratio of the copolymerization and homopolymerization of propylene is about 65:35 to 55:45, the polymerization temperature in the two kettle-type reactors is controlled in the range of 60-80° C., and the polymerization reactions are liquid phase bulk reactions.

The propylene polymer composition described herein can also be prepared by, apart from the above multi-step polymerization reactions, mechanical blending in melt state by using a routine mixing device such as screw extruder.

The propylene polymer composition described herein can be used for producing single- or multi-layer, uni- or bi-axially oriented film. The multi-layer oriented film has at least one layer containing the propylene polymer composition described herein.

The followings are directed in detail to BOPP film produced by the propylene polymer composition described herein. Prior to producing the BOPP film, the propylene polymer composition is generally pelletized by extrusion, during which various additives conventionally used in the field may be added, such as antioxidants, halogen-absord agents, light stabilizers, heat stabilizers, colorants and fillers. The antioxidants include phenols, phosphites and etc.; and the halogen-absord agents include aliphatic metal salts.

The BOPP film described herein can be produced by various well-known methods, such as flat-film method and tubular-film method. The flat-film method is often used. The method comprises the steps of: mixing raw materials, extruding, casting, longitudinally stretching, transversely stretching, edge cutting, treating with corona, coiling up, ageing, cutting, and packaging.

The BOPP film produced by the propylene polymer composition described herein exhibits excellent physical properties, which has, in the absence of any stiffening agent, relatively higher modulus and stiffness, with the transverse Young modulus being ≧5,000 MPa, even ≧5,300 Mpa, and the longitudinal Young modulus being ≧2,400 Mpa, even ≧2,600 Mpa. The film has a haze of no more than 0.5%. Owing to the special structure of the propylene polymer composition described herein, the process for producing the BOPP film is featured with a good film-forming stability and a film-forming stretching speed of greater than 380 m/min.

All the publications mentioned are incorporated herein for reference in their entirety for all purposes.

Unless identified otherwise, the percentages, ratios and amounts used herein are all on the basis of weight.

MODE OF CARRYING OUT THE INVENTION

The following examples are for illustrative purposes only and are not to be construed as limiting this invention in any manner.

The methods for determining relevant data of polymers and films in the present invention and its examples are as follows.

1. The overall isotacticity index and comonomer content of the propylene polymer composition are determined by the following method.

The overall isotacticity index $T_{overall}$ and comonomer ethylene (E) content of the propylene polymer composition described herein are determined by using AVANCE 400-nuclear magnetic resonance (NMR) spectrometer by Bruker company in Germany. The sample is dissolved at 140° C. using deuterated o-dichlorobenzene as solvent, and determined at 125° C. using a probe of 10 mm with a delay time (D1) of 10 seconds, a sampling time (AT) of 5 seconds, and a number of scanning of over 5,000 times. The steps of test operation, identification of spectral peaks and method of data processing are performed according to the test standard of NMR, and one can refer to the following document for more details: (1) James C. Randall, A Review of High Resolution Liquid $^{13}$Carbon Nuclear Magnetic Resonance Characterization of Ethylene-Based Polymers, JMS-REV. Macromol. Chem. Phys., C29 (2&3), 201-317 (1989). (2) Vincenzo Busico, Roberta Cipulo, Guglielmo Monaco, and Michele Vacatello, Full Assignment of the $^{13}$Carbon NMR Spectra of Regioregular Polypropylenes: Methyl and Methylene Region, Macromolecules, 30, 6251-6263 (1997).

The formula for calculation of overall isotacticity index is as follows:

$$T_{overall} = \frac{[mm] + \frac{1}{2}[mr \ \& \ PPE]}{[mm] + [mr \ \& \ PPE] + [rr \ \& \ EPE]}$$

2. The Determination of Dispersion index (R)—CRYSTAF Method

The crystallization distribution curve is determined by using CRYSTAF, model 200 manufactured by Polymer Characterization S. A. Co., Spain, thereby obtaining the Dispersion index (R) by using a data processing method "others" therein. Wherein, 1,2,4-trichlorobenzene is used as solvent (to which 2,6-dibutyl-p-methylphenol as antioxidant is added in a concentration of 0.3 g/l), the sample amount is 30 mg, the temperature of dissolving sample is set at 160° C., the rate of lowering temperature is 0.2° C./min, and other operations are performed according to the specification of the analyzer.

3. The melt flow rate (MFR) is determined under a load of 2.16 kg at 230° C. according to the method described in ISO1133.

4. The molecular weight distribution is determined by gel permeation chromatography (GPC), and generally calibrated by a narrow-distributed polystyrene standard sample.

5. The xylene-soluble is determined according to the method described in ASTM D5492-98.

6. The melting temperature and crystallization temperature are determined according to the method described in ASTM D3418-03.

7. The resin tensile strength is determined according to the method described in ASTM D638-00.

8. The resin flexural modulus is determined according to the method described in ASTM D790-97.

9. The Izod impact strength is determined according to the method described in ASTM D256-00.

10. The Charpy impact strength is determined according to the method described in GB/T 1043.

11. The haze of film is determined according to the method described in ASTM D1003-00.

12. The tensile strength and Young modulus of film are determined according to the method described in GB/T 13022-1991.

13. The heat shrinkage of film is determined according to the method described in ASTM D1204-02.

Unless identified otherwise, all of the above determinations are conducted under atmospheric environment.

EXAMPLE 1

1. Preparation of a Catalyst Active Component

The catalyst active component was prepared according to the method described in Example 1 of Chinese Patent CN1330086A, comprising Ti 2.4 wt %, Mg 18.0 wt %, and di-n-butyl phthalate 13 wt %.

2. Preparation of Propylene Polymer Composition

The polymerization reactions were continuously carried out in two loop reactors in series. Firstly, the above catalyst active component, triethylaluminum as co-catalyst component and cyclohexylmethyldimethoxysilane as external electron donor in a mass ratio of 1:10:2 were continuously added to a prepolymerization reactor, to which adequate liquid propylene was fed for prepolymerization at 15° C. for 6 min. The catalyst as prepolymerized was continuously added to the first loop reactor, to which propylene, ethylene and hydrogen in a mass ratio of 310000:1100:3 were fed to carry out the random copolymerization reaction of propylene for 1 h. Thereafter, the reactants were transferred to the second loop reactor for carrying out the homopolymerization reaction of propylene, to which fresh propylene and hydrogen in a mass ratio of 1500:1 were supplemented. The polymerization temperature in the two loop reactors was 70° C., and the yield ratio in the first and second loop reactors was controlled at 60:40. The properties of the polymer composition as obtained in the form of powder were shown in Table 1. Each of the above steps was carried out under a pressure higher than the saturated vapor pressure of propylene at 70° C., and two liquid phase loop reactors in series were used therein.

3. Production of BOPP Film 0.1 wt % Irgafos168 additive (antioxidant), 0.2 wt % Irganox1010 additive (antioxidant) and 0.1 wt % calcium stearate (halogen-absord agent) were added to the polymer powder as above obtained, which was then pelletized with a 65 mm twin-screw extruder at 220° C.

The materials as pelletized were extruded with a sheet extruder of Φ70 mm at 220° C. By using a flat-film continuous biaxial stretching device, the sheet as extruded was longitudinally oriented by 10 times at 140° C. and then transversely oriented by 8 times at 170° C., thereby obtaining a A-B-A type biaxially oriented film having a thickness of about 20 μm, with outside layers and core layer being the same polymer. The properties of the film were shown in Table 3.

EXAMPLE 2

1. Preparation of a catalyst active component: the same as that described in Example 1.

2. Preparation of propylene polymer composition

The reaction conditions were identical with those described in Example 1, except for that dicyclopentyldimethoxysilane was used as an external electron donor component, and the yield ratio in the first and second loop reactors was controlled at 65:35. The properties of the composition as obtained were shown in Table 1.

3. Production of BOPP film: the same as that described in Example 1. The properties of the film as obtained were shown in Table 3.

EXAMPLE 3

1. Preparation of a Catalyst Active Component

The catalyst active component was prepared according to the method described in Example 1 of Chinese Patent CN85100997, comprising Ti 2.03 wt %, Mg 17.8 wt %, and diisobutyl phthalate 12 wt %.

2. Preparation of propylene polymer composition: the same as that described in Example 1. The properties of the composition as obtained were shown in Table 1.

3. Production of BOPP film: the same as that described in Example 1. The properties of the film as obtained were shown in Table 3.

EXAMPLE 4

1. Preparation of a catalyst active component: the same as that described in Example 3.

2. Preparation of propylene polymer composition: the same as that described in Example 2. The properties of the composition as obtained were shown in Table 1.

3. Production of BOPP film: the same as that described in Example 1. The properties of the film as obtained were shown in Table 3.

COMPARATIVE EXAMPLE 1

The polymer used was a high-quality propylene homopolymer FS3011 (Chisso Co, Japan) for producing high-stiffness BOPP film, available in our country's market. A polypropylene biaxially oriented film was produced with a flat-film continuous biaxial stretching device according to the method described in Example 1.

COMPARATIVE EXAMPLE 2

1. Preparation of a catalyst active component: the same as that described in Example 3.

2. Preparation of propylene polymer composition

The polymerization reactions were continuously carried out in two loop reactors in series. Firstly, the catalyst active component, triethylaluminum as a co-catalyst component and cyclohexylmethyldimethoxysilane (in a mass ratio of 1:10:2) were continuously added to a prepolymerization reactor, to which adequate liquid propylene was fed for prepolymerization at 15° C. for 6 min. The catalyst as prepolymerized was continuously added to the first loop reactor, to which propylene, ethylene and hydrogen in a mass ratio of 31000:110:6 were fed to carry out the random copolymerization reaction of propylene for 1 h. Thereafter, the reactants were transferred to the second loop reactor for carrying out the homopolymerization reaction of propylene, to which fresh propylene and hydrogen in a mass ratio of 15000:3 were supplemented. The polymerization temperature in the two loop reactors was 70° C., and the yield ratio in the first and second loop reactors was controlled at 60:40. The properties of the polymer composition as obtained in the form of powder were shown in Table 1.

The hydrogen amounts in the two reactors were controlled so that the MFR value of the propylene copolymer is higher than that of the propylene homopolymer.

3. Production of BOPP film: the same as that described in Example 1. The properties of the film as obtained were shown in Table 3.

TABLE 1

Properties of the polymer compositions obtained in Examples 1-4 and Comparative Examples 1-2

|  | Example 1 | Example 2 | Example 3 | Example 4 | Comparative Example 1 (FS3011) | Comparative Example 2 |
|---|---|---|---|---|---|---|
| MFR (g/10 Min) of composition | 1.8 | 1.6 | 1.5 | 1.1 | 3.0 | 1.9 |
| MFR (g/10 Min) of Discharge from the first reactor | 0.23 | 0.24 | 0.29 | 0.27 | — | 2.0 |
| Ethylene content of the composition (wt %) | 0.43 | 0.45 | 0.38 | 0.39 | 0 | 0.43 |
| Weight-average molecular weight ($M_w/10^5$) | 4.61 | 5.07 | 5.02 | 4.86 | 3.56 | 4.34 |
| Molecular weight distribution index ($M_w/M_n$) | 7.2 | 7.6 | 5.9 | 6.7 | 5.3 | 4.8 |
| Overall isotacticity index of the composition (%) | 96.7 | 97.2 | 96.7 | 98.3 | 94.3 | 95.5 |
| Dispersion index R | 2.2 | 1.8 | 1.9 | 1.7 | 3.2 | 3.5 |
| Xylene-soluble (wt %) | 2.6 | 1.7 | 2.0 | 1.7 | 3.8 | 3.8 |
| Melting temperature (° C.) | 161.4 | 160.4 | 159.0 | 161.5 | 158.5 | 160.0 |
| Crystallization temperature (° C.) | 113.5 | 111.1 | 111.0 | 113.0 | 106.8 | 109.3 |
| Tensile strength (Mpa) | 41.8 | 43.3 | 41.2 | 44.8 | 43.2 | 38.2 |
| Flexural modulus (Gpa) | 1.73 | 1.72 | 1.67 | 1.84 | 1.63 | 1.56 |
| Izod impact strength (J/m) | 29.7 | 23.4 | 28.8 | 25.9 | 21.3 | 22.4 |
| Charpy impact strength (KJ/m$^2$) | 4.1 | 4.3 | 4.1 | 4.3 | 3.7 | 3.8 |

TABLE 2

Comparison between the present invention and some polypropylene resins for producing BOPP general-purpose film

|  | Example 1 | Example 2 | Example 3 | Example 4 | 4792E1 (Exxon) | S28C (Basell) | F280 (Shanghai Petrochemical Co.) |
|---|---|---|---|---|---|---|---|
| Ethylene content of the composition (wt %) | 0.43 | 0.45 | 0.38 | 0.39 | 0.41 | 0.32 | 0.24 |
| Overall isotacticity index of the composition (%) | 96.7 | 97.2 | 96.7 | 98.3 | 95.3 | 93.8 | 95.4 |
| Dispersion index R | 2.2 | 1.8 | 1.9 | 1.7 | 2.9 | 3.1 | 2.5 |
| Xylene-soluble (wt %) | 2.6 | 1.7 | 2.0 | 1.7 | 3.7 | 4.5 | 3.0 |

TABLE 3

Properties of BOPP films obtained in Examples 1-4 and Comparative Examples 1-2

|  | Example 1 | Example 2 | Example 3 | Example 4 | Comparative Example 1 | Comparative Example 2 |
|---|---|---|---|---|---|---|
| Thickness (μm) | 20 | 20 | 20 | 20 | 20 | 20 |
| Young modulus (Mpa) Longitudinal/transverse | 2940/5280 | 2971/5991 | 2986/5019 | 2984/5578 | 2324/4087 | 1890/3767 |
| Tensile strength (Mpa) Longitudinal/Transverse | 202/285 | 210/305 | 203/291 | 206/313 | 197/296 | 182/236 |
| Heat shrinkage (%) Longitudinal/Transverse | 2.7/1.1 | 2.4/1.1 | 2.5/1.1 | 2.1/1 | 2.8/1.3 | 2.8/1.4 |
| Haze (%) | 0.5 | 0.5 | 0.5 | 0.5 | 0.5 | 0.7 |
| Thickness derivation (%) | +1~+1.5 | +0.5~-4 | +2~-3 | +2~-3 | +11.5~+5 | +6~+5 |
| Average thickness derivation (%) | +1.2 | -2 | -0.8 | -0.8 | +8 | +5.5 |

As seen from the data of BOPP films shown in Table 3, in comparison with the high-stiffness BOPP films produced in the prior art (cf. Comparative Examples 1-2), the BOPP films produced by the polymer compositions of the present invention (cf. Examples 1-4) had transverse Young modulus higher by 20-40%, and longitudinal Young modulus higher by 20%, as well as higher tensile strength (longitudinal/transverse) and lower thickness derivation. Meanwhile, other properties of the BOPP films described herein are comparative to those in the Comparative Examples.

The invention claimed is:

1. A propylene polymer composition comprising propylene random copolymer and propylene homopolymer; wherein the propylene random copolymer is a copolymer of propylene and ethylene, optionally comprising one or more alpha-olefins of $C_4$-$C_{10}$; the propylene polymer composition has an overall isotacticity index, as determined by nuclear magnetic resonance method, of greater than or equal to 96.5%, and an ethylene content of 0.3 wt % to 0.8 wt %.

2. The propylene polymer composition according to claim 1, wherein the melt flow rate of the propylene random copolymer is lower than that of the propylene homopolymer.

3. The propylene polymer composition according to claim 1, which has an overall isotacticity index of greater than or equal to 97%.

4. The propylene polymer composition according to claim 1, which has an overall isotacticity index of greater than or equal to 97.5%.

5. The propylene polymer composition according to claim 1, which has a Dispersion index R of less than or equal to 2.5 according to the crystallization distribution curve as determined by a CRYSTAF model 200.

6. The propylene polymer composition according to claim 1, which has a Dispersion index R of less than or equal to 2.0 according to the crystallization distribution curve as determined by a CRYSTAF model 200.

7. The propylene polymer composition according to claim 1, wherein the content of fraction soluble in xylene at room temperature 25° C. is less than 3.0 wt %.

8. The propylene polymer composition according to claim 1, wherein the propylene random copolymer has a melt flow rate of 0.05-0.5 g/10 min, and the propylene polymer composition has a melt flow rate of 1-8 g/10 min, as determined under a load of 2.16 kg at 230° C. according to the method of ISO1133.

9. The propylene polymer composition according to claim 1, wherein the propylene random copolymer has a melt flow rate of 0.1-0.3 g/10 min, and the propylene polymer composition has a melt flow rate of 1-3 g/10 min.

10. The propylene polymer composition according to claim 1, which has a molecular weight distribution index $M_w/M_n$ of 4-10.

11. The propylene polymer composition according to claim 1, wherein the mass ratio of the propylene random copolymer and the propylene homopolymer is 30:70-70:30.

12. The propylene polymer composition according to claim 1, comprising propylene random copolymer and propylene homopolymer, wherein the propylene random copolymer is a copolymer of propylene and ethylene, and the propylene polymer composition is characterized by having:

(1) an overall isotacticity index, as determined by nuclear magnetic resonance method, of greater than or equal to 97%;

(2) an ethylene content of 0.3-0.8 wt %; and (3) a Dispersion index R of less than or equal to 2.5 according to the crystallization distribution curve as determined by a CRYSTAF model 200.

13. The propylene polymer composition according to claim 12, wherein the content of fraction soluble in xylene at room temperature 25° C. is less than 2.6 wt %, and the propylene polymer composition has a melt flow rate of 1-3 g/10 min, wherein the propylene random copolymer has a melt flow rate of 0.1-0.3 g/10 min.

14. A method for preparing the propylene polymer composition according to claim 1, which comprises, in the presence of a Ziegler-Natta catalyst having high stereo-selectivity, two-step polymerization reactions as follows: copolymerizing propylene with ethylene and optionally one or more alpha-olefins of $C_4$-$C_{10}$ to obtain a propylene random copolymer; and homopolymerizing propylene to obtain a propylene homopolymer; wherein, the amounts of molecular weight regulator used in the two-step polymerization reactions are controlled so that the melt flow rate of the propylene random copolymer is lower than that of the propylene homopolymer; and the yield ratio of the copolymerization and homopolymerization of propylene is 30:70 to 70:30.

15. The method according to claim 14, wherein the two-step polymerization reactions are continuously carried out in at least two reaction zones in series.

16. A method according to claim 14, which comprises subjecting propylene to continuous random copolymerization and homopolymerization reactions in two loop reactors in series; wherein, in the presence of a Ziegler-Natta catalyst having high stereo-selectivity, the random copolymerization reaction of propylene and ethylene is carried out in the first loop reactor for a certain time, thereafter the reactants are transferred to the second loop reactor for carrying out the homopolymerization reaction of propylene; and wherein, a molecular weight regulator is added in different amounts to the first and second loop reactors, so that the MFR value of the propylene copolymer in the first stage is lower than that of the propylene homopolymer in the second stage; the yield ratio in the first and second loop reactors is about 65:35 to 55:45, the polymerization temperature in the two loop reactors is controlled in the range of 60-80° C., and the polymerization reactions are liquid phase bulk reactions.

17. A method according to claim 14, wherein the Ziegler-Natta catalyst having high stereo-selectivity comprises a Ti-containing active solid catalyst component, an organic aluminum compound as a co-catalyst component, and an organic silicon compound as an external electron donor component.

18. A method according to claim 17, wherein, in the Ziegler-Natta catalyst having high stereo-selectivity, the ratio of the organic aluminum compound as a co-catalyst component and the organic silicon compound as an external electron donor component, based on the molar ratio of Al/Si is 4-30.

19. An oriented film produced by the propylene polymer composition according to claim 1, which is single- or multi-layer, uni- or bi-axially oriented film, and the multi-layer oriented film has at least one layer containing said propylene polymer composition.

20. The film according to claim 19, wherein said oriented film is biaxially oriented film, and the biaxially oriented film has, in the absence of any stiffening agent, a transverse Young modulus of 5,000 MPa, and a longitudinal Young modulus of 2,400 MPa.

21. The propylene polymer composition according to claim 1, wherein the propylene polymer composition is prepared by a method which comprises, in the presence of a Ziegler-Natta catalyst having high stereo-selectivity, a two-step polymerization reaction as follows: copolymerizing propylene with ethylene and optionally one or more alpha-olefins of $C_4$-$C_{10}$ to obtain a propylene random copolymer; and homopolymerizing propylene to obtain a propylene homopolymer; wherein, the amounts of molecular weight regulator used in the two-step polymerization reactions are controlled so that the melt flow rate of the propylene random copolymer is lower than that of the propylene homopolymer; and the yield ratio of the copolymerization and homopolymerization of propylene is 30:70 to 70:30.

* * * * *